United States Patent [19]
McGrath et al.

[11] Patent Number: 5,699,981
[45] Date of Patent: Dec. 23, 1997

[54] AIRCRAFT CAVITY ACOUSTIC RESONANCE SUPPRESSION SYSTEM

[75] Inventors: Stephen F. McGrath, Kettering; Leonard L. Shaw, Troy, both of Ohio

[73] Assignee: The United States of America as represented by the Secretary of the Air Force, Washington, D.C.

[21] Appl. No.: 617,145

[22] Filed: Mar. 18, 1996

[51] Int. Cl.$^6$ ...................................... B64C 23/06
[52] U.S. Cl. ................... 244/1 N; 244/130; 244/137.4; 181/206
[58] Field of Search .................. 244/1 N, 118.1, 244/130, 137.1, 137.4; 181/206, 210, 213

[56] References Cited

U.S. PATENT DOCUMENTS

| | | | |
|---|---|---|---|
| H501 | 8/1988 | Rubin et al. | 244/130 X |
| 2,353,856 | 7/1944 | Shannon | 244/130 X |
| 2,685,470 | 8/1954 | Werner | 244/130 X |
| 2,749,064 | 6/1956 | Kuhlman, Jr. | 244/130 X |
| 3,934,846 | 1/1976 | Maurer | 244/130 |
| 4,697,764 | 10/1987 | Hardy et al. | 244/137.4 |
| 4,863,118 | 9/1989 | Stallings, Jr. et al. | 244/130 |
| 5,018,683 | 5/1991 | Hahn et al. | 244/130 X |
| 5,018,688 | 5/1991 | Stallings, Jr. et al. | 244/130 X |
| 5,340,054 | 8/1994 | Smith et al. | 244/1 N |

*Primary Examiner*—William Grant
*Attorney, Agent, or Firm*—Bobby D. Scearce; Thomas L. Kundert

[57] ABSTRACT

An aircraft cavity acoustic resonance suppression system is described which comprises a small diameter, substantially cylindrically shaped member disposed substantially parallel to and spaced up to a distance corresponding to about three airflow boundary layer thicknesses from the surface of the aircraft near the leading edge of the cavity and substantially transverse of airflow thereacross, and an actuator operatively connected to the member providing selective adjustment of the spacing between the member and the aircraft surface.

5 Claims, 1 Drawing Sheet

5,699,981

AIRCRAFT CAVITY ACOUSTIC RESONANCE SUPPRESSION SYSTEM

RIGHTS OF THE GOVERNMENT

The invention described herein may be manufactured and used by or for the Government of the United States for all governmental purposes without the payment of any royalty.

BACKGROUND OF THE INVENTION

The present invention relates generally to structures and methods for controlling vibration and acoustic levels in aircraft structures, and more particularly to a high frequency tone generator for attenuating acoustic levels in aircraft cavities, bays and the like.

Airflow over an open bay cavity in an aircraft in flight can induce acoustic resonances within the cavity at pressure levels as high as 175 dB. Acoustic pressures of this magnitude may result in material fatigue/failure in the aircraft structure or in damage to instrumentation or stores disposed within the cavity. Control and attenuation of any generated resonances is therefore highly desirable.

Typical aircraft bay cavity resonance is characterized by six major components including an unstable shear layer which characteristically forms over the cavity mouth, the interaction of the unstable shear layer with the downstream wall, the acoustic waves generated at the rear wall of the cavity, the propagation of these waves to the front wall, the interaction of these waves with the shear layer at the leading edge, and cavity geometry. The shear layer contains instabilities and vortices, shed at various frequencies depending on cavity geometry and the speed and density of the airflow past the cavity. If the cavity geometry resonant frequency is near a frequency or harmonic of the instabilities in the shear layer, a resonance condition will occur and consequently increase acoustic levels within the cavity.

Prior state-of-the-art devices for suppression of resonances within aircraft cavities include passive cavity leading edge spoilers, the use of which have two major drawbacks. First, passive leading edge spoilers are designed to suppress the cavity resonance for a very limited Mach number range, and operation of the aircraft outside those design conditions can lead to little suppression or even increased acoustic pressure levels within the cavity. Second, the passive spoilers are often relatively large, and can add to aircraft weight and radar cross section.

The invention solves or substantially reduces in critical importance problems with prior art cavity resonance suppression systems for aircraft by providing a high frequency tone generator system which generates airflow vortices across a region of the cavity mouth at frequencies greater than the characteristic resonant frequency of the cavity for substantially all modern aircraft flight envelopes. The attainable frequency within this region can be orders of magnitude higher than the characteristic frequency of the cavity, which interrupts any acoustic resonance condition within the cavity and consequently attenuates acoustic pressure levels therewithin. The invention is simpler, lighter and smaller in construction than prior art resonance suppression devices.

It is therefore a principal object of the invention to provide an acoustic resonance suppression system for aircraft cavities.

It is a further object of the invention to provide a system for controlling acoustic levels in aircraft structure cavities.

It is a further object of the invention to provide a system and method for controlling high acoustic levels in aircraft structure cavities to prevent operational failure of equipment disposed therein.

These and other objects of the invention will become apparent as a detailed description of representative embodiments proceeds.

SUMMARY OF THE INVENTION

In accordance with the foregoing principles and objects of the invention, an aircraft cavity acoustic resonance suppression system is described which comprises a small diameter, substantially cylindrically shaped member disposed substantially parallel to and spaced up to a distance corresponding to about three airflow boundary layer thicknesses from the surface of the aircraft near the leading edge of the cavity and substantially transverse of airflow thereacross, and an actuator operatively connected to the member providing selective adjustment of the spacing between the member and the aircraft surface.

BRIEF DESCRIPTION OF THE DRAWINGS

The invention will be more clearly understood from the following detailed description of representative embodiments thereof read in conjunction with the accompanying drawings wherein.

DETAILED DESCRIPTION

Figure 1:
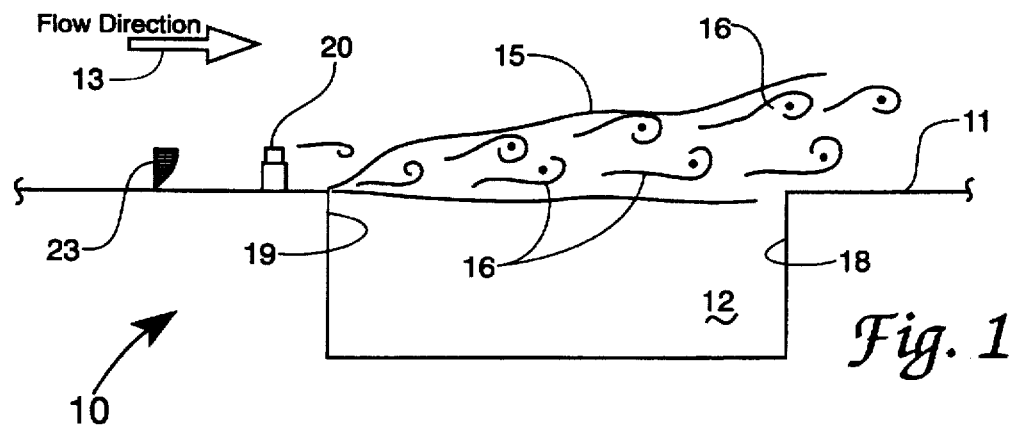
FIG. 1 is a schematic cross section of a cavity in an aircraft structure illustrating the governing principle of the invention.

Referring now to the drawings, FIG. 1 shows a schematic cross section at an external surface 11 of an aircraft 10 structure having representative cavity 12 therein, such as a weapons bay cavity, for illustrating the governing principle of the invention. In the operation of aircraft 10, cavity 12 may be intermittently opened during flight, resulting in a high velocity airflow 13 past cavity 12 and an airflow shear layer 15 over cavity 12. Shear layer 15 contains instabilities represented by vortices 16 shed at various frequencies across cavity 12 depending on cavity 12 geometry, aircraft 10 speed, and density of airflow 13. The instabilities in airflow 13 across cavity 12 may set up an acoustic wave in cavity 12 between rear wall 18 and leading edge 19 of cavity 12. If cavity 12 geometry corresponds substantially in size to a frequency or harmonic of the instabilities in shear layer 15, a feedback loop will be generated whereby the acoustic wave reflected off rear wall 18 will strengthen the instabilities at cavity leading edge 19 and consequently increase acoustic levels within cavity 12.

In accordance with a governing principle of the invention, the frequency of the shed vortices 16 within shear layer 15 can be fixed for a finite region defined between leading edge 19 and rear wall 18 of cavity 12 by generating a disturbance in a discrete frequency range near leading edge 19. For cavity sizes normally existent in modern aircraft, viz., about one to twenty feet, substantially high frequencies in the range of about 100 to 20,000 Hz must be generated. A cylinder placed in an airflow 13 will shed vortices 16 at a frequency dependent on the speed and density of the airflow, cylinder diameter and a non-dimensional quantity, the Strouhal number. For a large range of flows of from about 200 to 2000 ft/sec, the Strouhal number is a fixed quantity (0.2), so that the shedding frequency is dependent substantially only on airflow speed and cylinder diameter. For typical aircraft flight speeds (about 200 to 2000 ft/sec)), cylinder shedding frequencies at least two orders of magnitude higher than the natural frequency characteristic of a typical aircraft cavity 12 may be obtained. In accordance then with the teachings of the invention, placement of a high frequency tone generator 20 near leading edge 19 of cavity 12, substantially as shown in FIG. 1 results in the shear layer 15 instability frequency being fixed over the entire cavity 12 length. Because the frequency within this portion of cavity 12 may be at least two orders of magnitude higher than the frequency characteristic of cavity 12 geometry, any sustained acoustic resonance within cavity 12 is interrupted and high acoustic pressure levels within cavity 12 are significantly attenuated.

Figure 2:
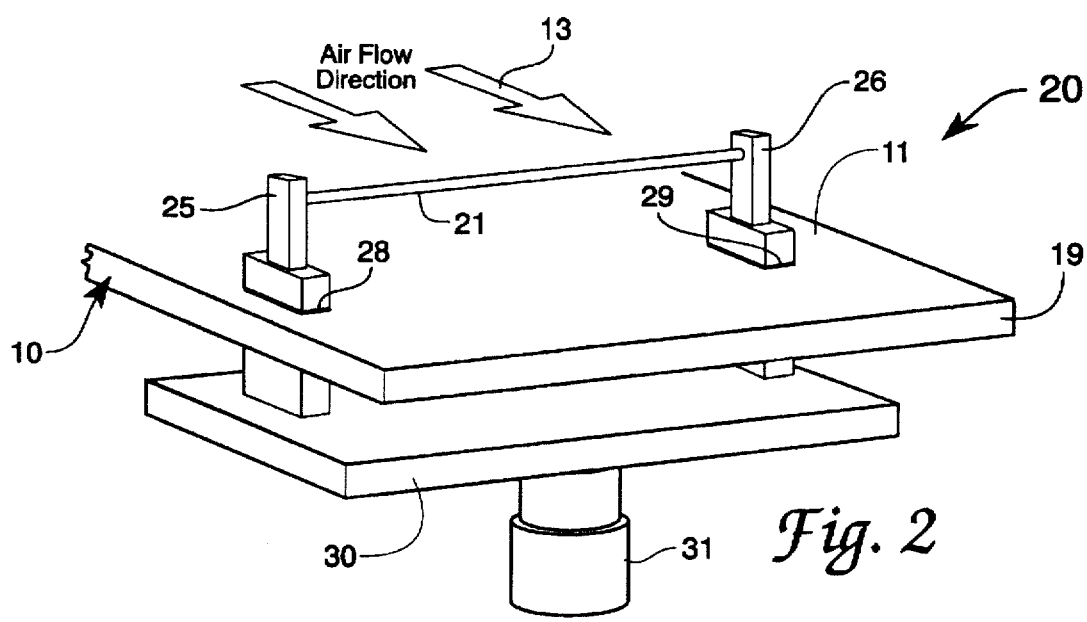
FIG. 2 is a diagram of a high frequency tone generator usable in the practice of the invention.

With reference now additionally to FIG. 2, and in accordance with the teachings of the invention, a high frequency tone generator 20 structure may be disposed near the leading edge 19 of cavity 12 for suppression of acoustic resonances therewithin. The structure of generator 20 preferably comprises a substantially cylindrically shaped member 21 disposed substantially parallel to and in spaced relationship with surface 11 of aircraft 10, near leading edge 19 of cavity 12 and substantially transverse of airflow 13. For aircraft 10 velocities (i.e. airflow 13 speeds) suggested above, member 21 preferably has a diameter in the range of about 0.5 to 12 cm; because the beneficial effect of the placement of member 21 diminishes with distance from leading edge 19, it is preferable that member 21 be placed as near as practicable to leading edge 19; the spacing between member 21 and surface 11 is preferably a distance of up to 3 boundary layer 23 thicknesses (boundary layer being defined herein as a distance from surface 11 at which the airflow velocity is 0.99 times airflow velocity 13). Wind tunnel tests have shown that for optimum effect of member 21 on resonance suppression within cavity 12, the length of member 21 is preferably from about 75 percent to about 100 percent of the width of cavity 12 at leading edge 19. Member 21 is supported at respective ends thereof by a set of movable posts 25,26 allowing selective adjustment of the spacing between member 21 and surface 11 within boundary layer 23. Member 21 and posts 25,26 may be comprised of suitable material customarily used in aircraft construction, such as, preferably, aluminum, titanium or a composite, the specific material selected not being limiting of the invention.

Airflow 13 over member 21 generates a wake of vortices, shed at a frequency dependent on the speed and density of airflow 13 and the diameter of member 21. Because the speed and density of airflow 13 over member 21 is affected by flying conditions for aircraft 10 and the distance by which member 21 is spaced from leading edge 19, configuring member 21 to be movable with respect to surface 11 is the much preferred structure for generator 20. Accordingly, in a representative structure for generator 20 depicted in FIG. 2, a pair of slots 28,29 may be provided in surface 11 for slideably receiving respective posts 25,26. A supporting plate 30 supporting posts 25,26 and operatively connected to actuating means 31 provides the desired movability to posts 25,26 and adjustment of the spacing between member 21 and surface 11. Any suitable actuating means 31 may be used, including commercially available actuators, such as a motor, cam or hydraulic cylinder.

Figure 3:
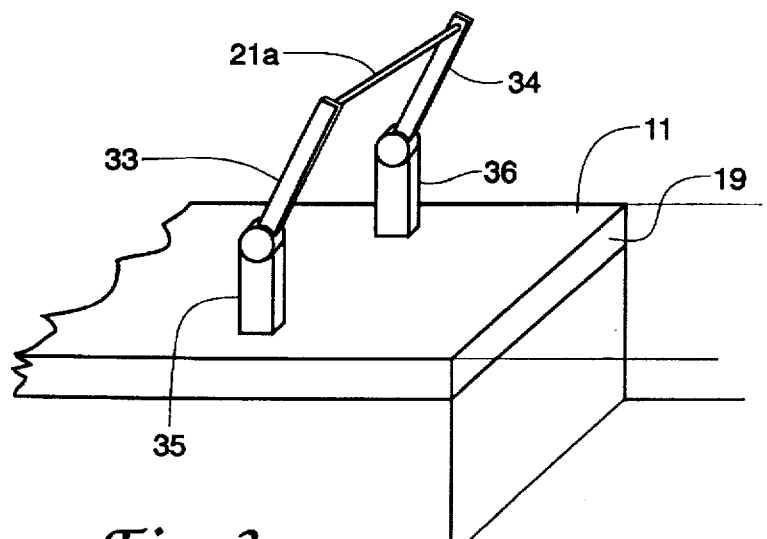
FIG. 3 shows an alternative activator structure for the invention.

It is understood that structures other than that described herein for providing movability to member 21 with respect to surface 11 may be envisioned by one skilled in the art practicing the invention, selection of a specific structure and moving means not considered limiting of the invention, within the scope of these teachings and the appended claims. For example, and with reference now to FIG. 3, shown schematically therein is an alternative actuator structure for the invention. In FIG. 3 member 21a is supported between a pair of arms 33,34 rotatably connected to supports 35,36 on surface 11. Means included within the structure of one of the supports 35,36, or otherwise operatively connected thereto, selectively rotate member 21a to any desired spacing from surface 11 corresponding to the sizing of arms 33,34 and supports 35,36.

The invention therefore provides an aircraft cavity acoustic resonance suppression system including a high frequency tone generator of novel structure described herein. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

We claim:

1. An aircraft cavity acoustic resonance suppression system, which comprises:
   (a) a high frequency tone generator comprising a small diameter, substantially cylindrically shaped member disposed substantially parallel to and in spaced relationship with a surface of an aircraft near the leading edge of a cavity defined in said surface of said aircraft;
   (b) said member being sized in length to subtend from about 75 to 100 percent of the length of said leading edge; and
   (c) said member being disposed substantially transverse of the direction of airflow across said cavity;
   (d) whereby, in use, said member generates vortices in said airflow across said cavity at frequencies greater than the characteristic resonant frequency of said cavity.

2. The system of claim 1 wherein said member is spaced from said surface a distance up to about three times the boundary layer thickness of said airflow along said surface.

3. The system of claim 1 further comprising actuating means operatively connected to said member for selectively adjusting the spacing between said member and said surface.

4. The system of claim 3 wherein said actuating means is a motor, cam or hydraulic cylinder.

5. The system of claim 1 wherein said member is about 0.5 to about 12 centimeters in diameter.

* * * * *